United States Patent [19]

Yip et al.

[11] Patent Number: 4,724,467
[45] Date of Patent: Feb. 9, 1988

[54] LIGHT BLOCKING STOP FOR ELECTRO-OPTIC LINE PRINTERS

[75] Inventors: Kwok-leung Yip; Sidney W. Marshall, both of Webster, N.Y.

[73] Assignee: Xerox Corporation, Stamford, Conn.

[21] Appl. No.: 483,999

[22] Filed: Apr. 11, 1983

[51] Int. Cl.[4] .......................................... G03G 15/28
[52] U.S. Cl. .......................................... 355/71; 355/8; 354/112
[58] Field of Search ............... 354/229, 270; 350/319; 355/8, 71

[56] References Cited

U.S. PATENT DOCUMENTS

| | | | |
|---|---|---|---|
| 3,681,519 | 8/1972 | Larsen et al. | 178/5.4 ST |
| 3,731,606 | 5/1973 | Geoffray | 354/112 X |
| 4,059,347 | 11/1977 | Eitel | 350/319 |
| 4,081,673 | 3/1978 | Swindell et al. | 250/237 R |
| 4,083,627 | 4/1978 | Okano | 350/162 SF |
| 4,183,623 | 1/1980 | Haines | 350/162 SF |
| 4,248,517 | 2/1981 | Nishikawa | 355/71 X |
| 4,282,510 | 8/1981 | Southgate | 340/146.3 F |
| 4,282,511 | 8/1981 | Southgate et al. | 340/146.3 F |
| 4,290,675 | 9/1981 | Beiser | 354/112 |

Primary Examiner—Ulysses Weldon
Attorney, Agent, or Firm—Frederick E. McMullen

[57] ABSTRACT

The stop for the Schlieren imaging optics which are used in an electro-optic line printer to image a multigate light valve onto a photosensitive recording medium has smoothly tapered sides to reduce crosstalk between the pixels of the image. As a result, the transmittance of the imaging aperture, as viewed along the modulation axis of the printer, rolls off relatively gradually and more or less continuously along the edges of the stop, thereby reducing the high angle diffraction off the stop so that the troublesome sidelobes of the coherent amplitude point spread function of the imaging system are suppressed. The stop preferably is in the shape of a parallelogram selected to substantially attenuate either the zero order or the higher order diffraction components of the phase front modulated light beam exiting from the light valve so that the intensity profile of the remaining or unattenuated light has the required image characteristics. Variations in the basic parallelogram shape wherein the stop sides have specially curved configurations to optimize triangular, cosine, and Gaussian light amplitude transmittance profiles are also disclosed.

5 Claims, 20 Drawing Figures

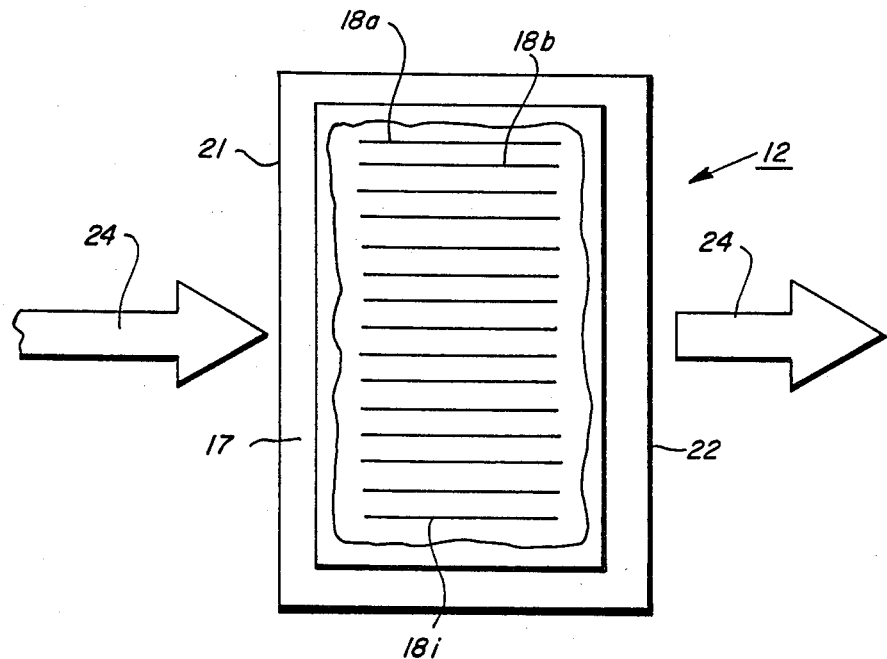
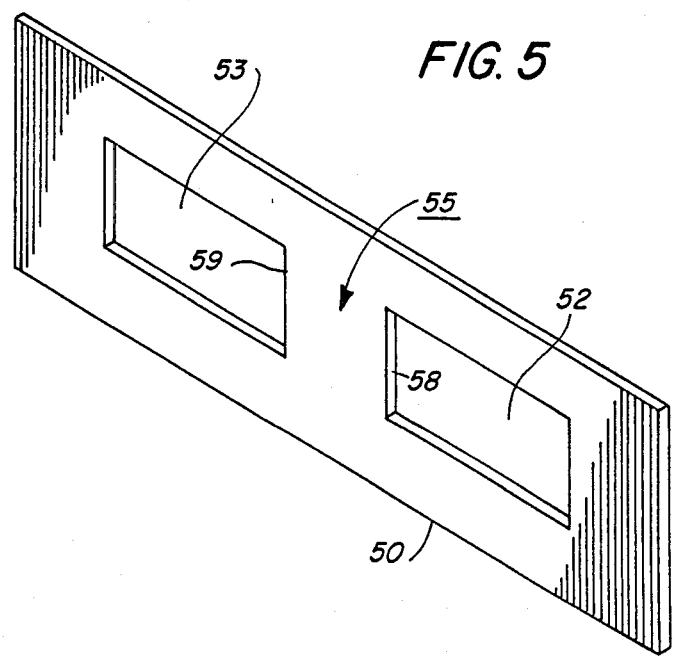

RECTANGULAR STOP

TRIANGULAR STOP

COSINE STOP

GAUSSIAN STOP

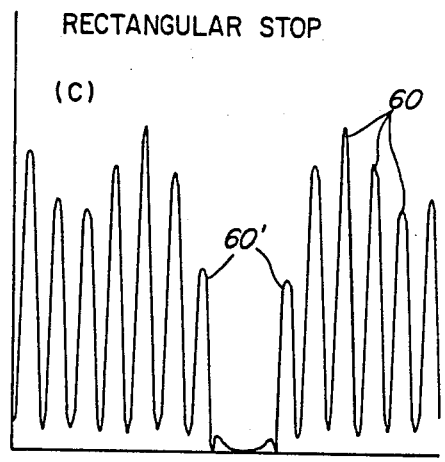
FIG. 7a RECTANGULAR STOP
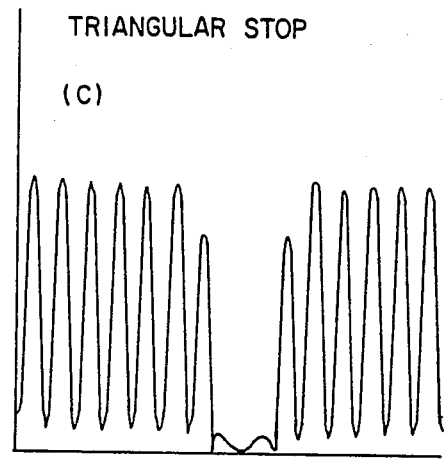
FIG. 7b TRIANGULAR STOP
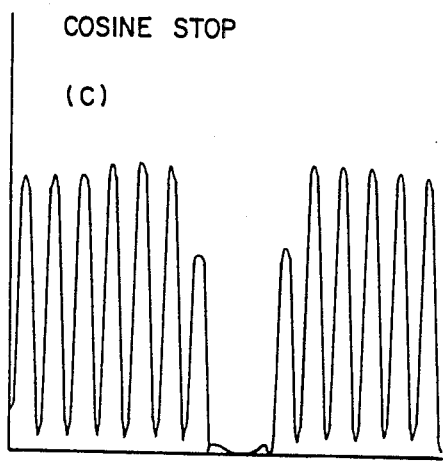
FIG. 7c COSINE STOP
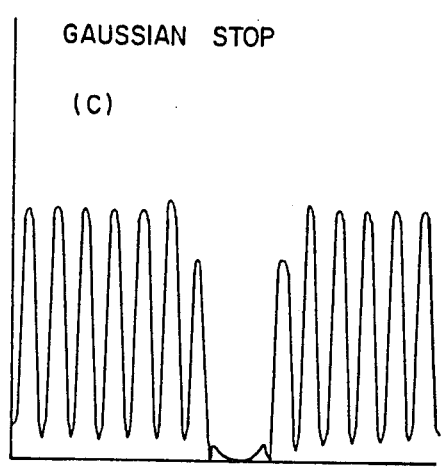
FIG. 7d GAUSSIAN STOP

LIGHT BLOCKING STOP FOR ELECTRO-OPTIC LINE PRINTERS

This invention relates to electro-optic line printers and, more particularly, to an improved beam stop for suppressing unwanted interpixel crosstalk in the output of such a printer.

It has been shown that an electro-optic element having a plurality of individually addressable electrodes can be used as a multigate light valve for line printing. See, for example, U.S. Pat. No. 4,282,904 on a "TIR Electro-Optic Modulator With Individually Addressed Electrodes," which issued Aug. 4, 1981 on an application of R. A. Sprague et al. Also see "Light Gates Give Data Recorder Improved Hardcopy Resolution," *Electronic Design*, July 19, 1979, pp. 31-32, "Polarizing Filters Plot Analog Waveforms," *Machine Design*, Vol. 51, No. 17, July 26, 1979, p. 62; and "Data Recorder Eliminates Problem of Linearity," *Design News*, Feb. 4, 1980, pp. 56-57.

As is known, almost any optically transparent electro-optical material can be used as the electro-optic element of such a light valve. The most promising materials now appear to be $LiNbO_3$ and $LiTaO_3$, but there are others which merit consideration, including BSN, KDP, $KD_xP$, $Ba_2NaNb_5O_{15}$ and PLZT. To control the light valve, the electrodes are intimately coupled to the electro-optic element and are distributed widthwise thereof, typically on equidistantly spaced centers.

For certain applications, such as high resolution line printing, the electrodes are densely packed on centers of, say, ten microns or even less. Fortunately, it has been found that the electrical interface for such a light valve can be significantly simplified if the electrodes are fabricated on a separate substrate, such as silicon integrated circuit, and pressed or otherwise held closely adjacent the electro-optic element to "proximity couple" electric fields into the electro-optic element. See a copending and commonly assigned U.S. patent application of W. D. Turner, which was filed Sept. 17, 1980, under Ser. No. 187,936 on "Proximity Coupled Electro-Optic Devices," and a copending and commonly assigned U.S. patent application of R. A. Sprague et al, which was filed Sept. 17, 1980 under Ser. No. 188,171 on "Integrated Electronics for Proximity Coupled Electro-Optic Devices."

To apply a multigate light valve, the electro-optic element is more or less uniformly illuminated across essentially its full width by a sheet-like, collimated light beam. Additionally, successive sets of data samples, each representing the picture elements for a respective line of an image, are sequentially applied to the electrodes, thereby serially generating localized electric field patterns corresponding to the picture elements for successive lines of the image. The localized fields which exist at any given point in time are coupled into the electro-optic element, thereby causing localized variations in its refractive index which, in turn, spatially modulate the phase front of the light beam in accordance with the picture elements or "pixels" for a particular line of the image.

Typically, Schlieren central dark field or central bright field imaging optics are employed to convert the phase front modulation of the light beam into a series of corresponding intensity profiles so that the light valve can be imaged onto a more or less standard photosensitive recording medium. To that end, the zero order diffracted components of the modulated light beam are brought to focus at the center of the aperture of an imaging lens which, in turn, images the light valve onto the recording medium. In other words, the zero order components of modulated beam are collected as the principal rays for imaging, thereby ensuring that substantially the same amount of light is collected from each of the several electrode bounded regions of the electro-optic element (typically each such region bridges between a respective pair of electrodes) and that more or less uniform imaging conditions are maintained across essentially the full width of the light valve. For central dark field imaging, a stop blocks out the zero order diffraction components of the modulated beam, but the higher order diffraction components thereof scatter around the stop and are brought to focus on the recording medium. Conversely, for central bright field imaging, the higher order diffraction components are blocked by a stop, while the zero order components are focused onto the recording medium. Regardless of whether central dark field or central bright field imaging is used, the recording medium is exposed to a series of line images having intensity profiles which represent the pixels for successive lines of a complete image.

The stop for a classical central dark field Schlieren imaging system usually has a rectangular spatial profile. However, after careful study and analysis, it has been found that such a stop is responsible for producing unwanted interpixel crosstalk in images printed by electro-optic line printers of the above described type.

In accordance with the present invention, the stop for the Schlieren imaging optics which are used in an electro-optic line printer to image a multigate light valve onto a photosensitive recording medium has smoothly tapered sides to reduce crosstalk between the pixels of the image. As a result, the transmittance of the imaging aperture rolls off relatively gradually and more or less continuously along the edges of the stop, thereby reducing the high angle diffraction off the stop so that the troublesome sidelobes of the coherent amplitude point spread function of the imaging system are suppressed. For example, the stop preferably has a parallelogram profile to substantially attenuate either the zero order or the higher order diffraction components of the phase front modulated light beam exiting from the light valve so that the intensity profile of the remaining or unattenuated light has the required image characteristic.

In the Drawings

FIG. 4 is an enlarged cutaway bottom view of the TIR light valve of FIG. 3 which illustrates a typical pattern of individually addressable electrodes;

FIG. 5 is an enlarged view showing details of the rectangular beam stop for the electro-optic line printer of FIGS. 1 and 2;

FIGS. 7a-7d are diagrams illustrating the effect of the rectangular, triangular, cosine and Gaussian light amplitude transmittance profiles of FIGS. 6a–6d on a test aerial image line in which two successive picture elements are turned off and the remaining picture elements turned on;

Figure 6A:
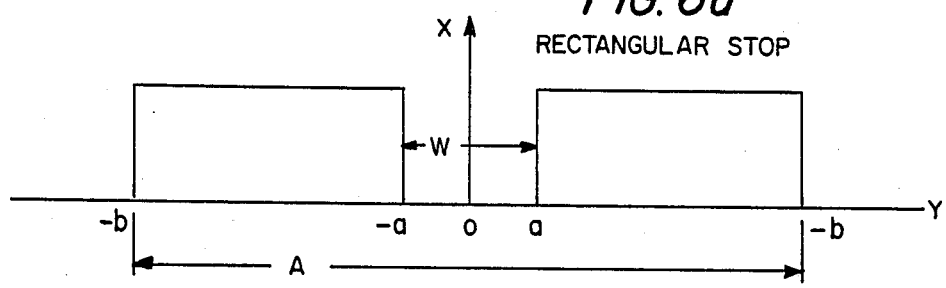
FIGS. 6a-6d are diagrams illustrating the rectangular light amplitude transmittance profile for the beam stop shown in FIG. 5, and more desirable triangular, cosine, and Gaussian light amplitude transmittance profiles.
Figure 6B:
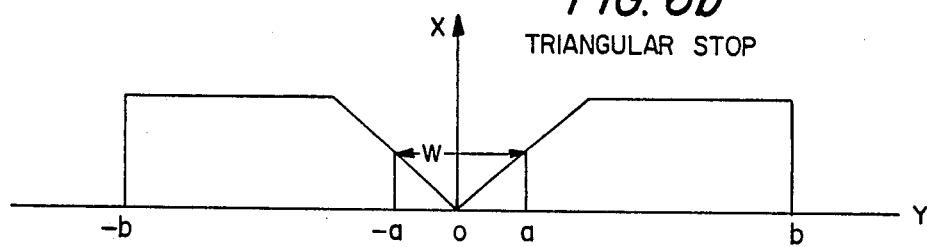
Figure 6C:
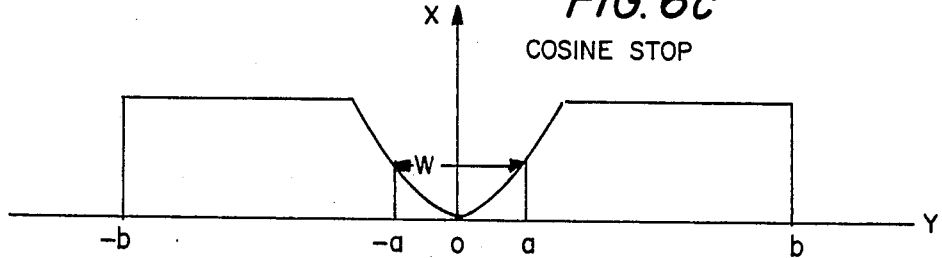
Figure 6D:
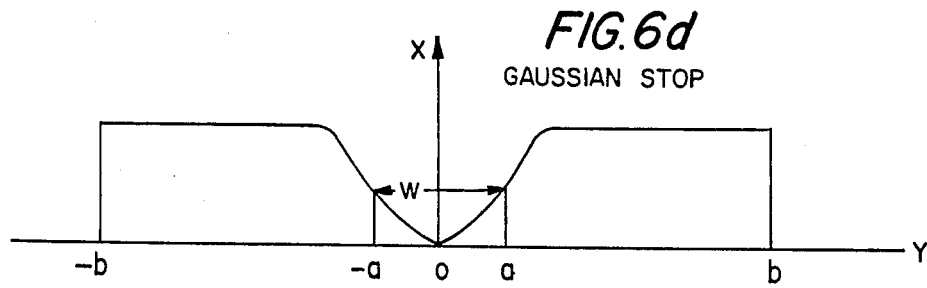
Figure 10A:
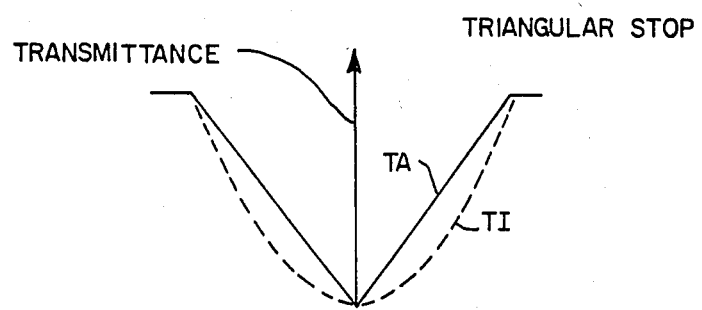
Figure 10B:
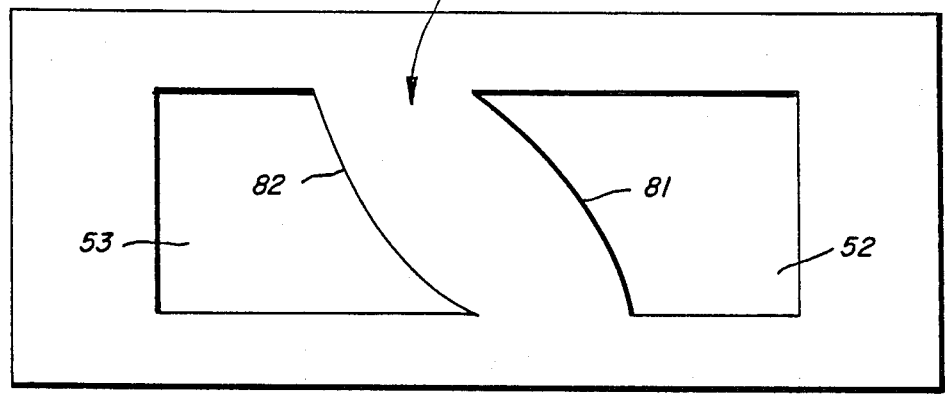
Figure 11A:
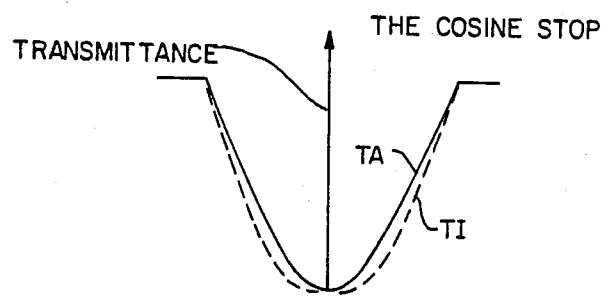
Figure 11B:
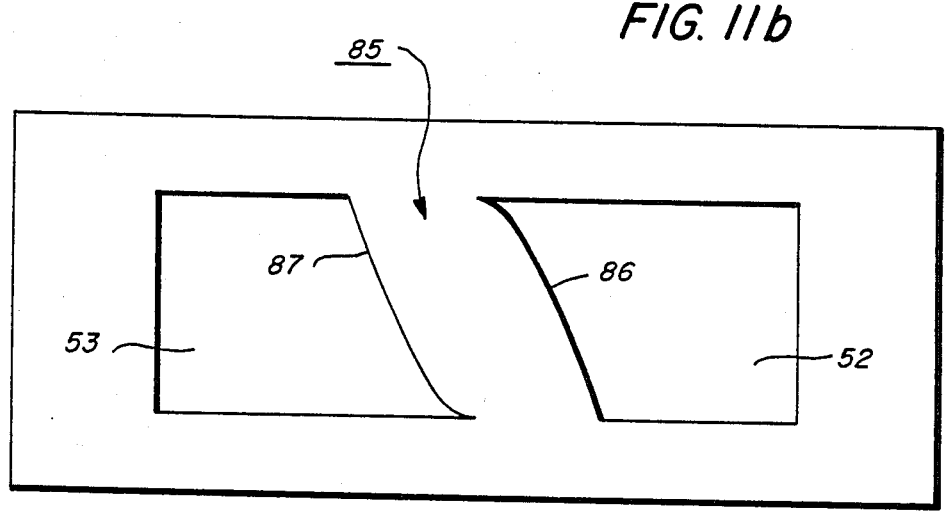

FIGS. 10a, 10b are views of an alternate beam stop capable of providing the improved triangular light amplitude transmittance profile shown in FIG. 6b, with the triangular light amplitude transmittance profile being superimposed thereon for clarity; and FIGS. 11a, 11b are views of second alternate beam stop capable of providing the improved cosine light amplitude transmittance profile shown in FIG. 6c, with the cosine light amplitude transmittance profile being superimposed thereon for clarity.

While the invention is described in some detail hereinbelow with reference to particular embodiments, it is to be understood that there is no intent to limit it to those embodiments. On the contrary, the aim is to cover all modifications, alternatives and equivalents falling within the spirit and scope of the invention as defined by the appended claims.

Figure 1:
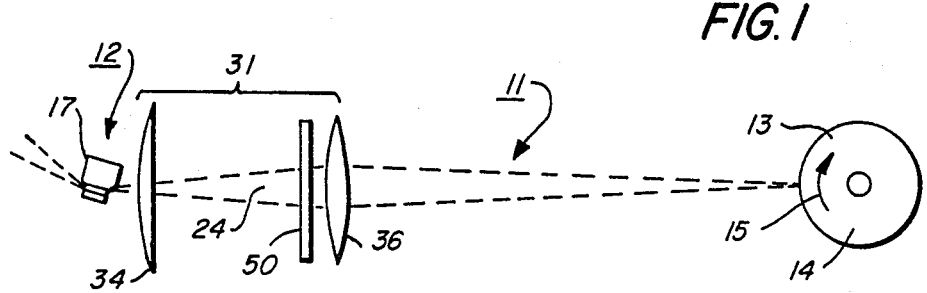
FIG. 1 is a schematic side view of an electro-optic line printer including Schlieren imaging optics constructed in accordance with the present invention.
Figure 2:
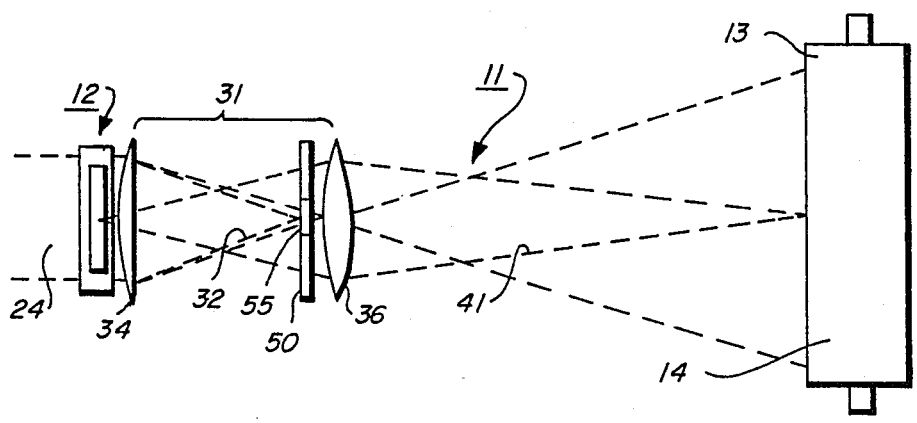
FIG. 2 is a schematic bottom plan view of the electro-optic printer shown in FIG. 1.

Turning now to the drawings, and at this point especially to FIGS. 1 and 2, there is an electro-optic line printer 11 comprising a multigate light valve 12 for exposing a photosensitive recording medium 13 in an image configuration. The recording medium 13 is depicted as being a photoconductively coated xerographic drum 14 which is rotated (by means not shown) in the direction of the arrow 15. Nevertheless, it will be evident that other xerographic and non-xerographic recording media could be used, including photoconductively coated xerographic belts and plates, as well as photosensitive film and coated paper in web or cut sheet stock form. Thus, the recording medium 13 should be visualized in the generalized case as being a photosensitive medium which is exposed in an image configuration while advancing in a cross line or line pitch direction relative to the light valve 12.

Figure 3:
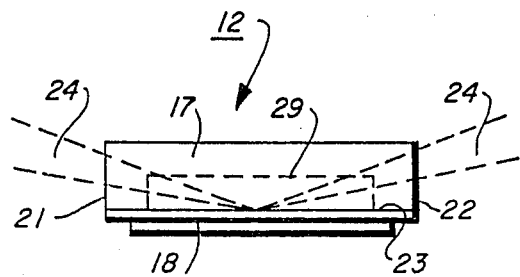
FIG. 3 is an elongated side view of a TIR light valve for the electro-optic line printer of FIGS. 1 and 2.

As shown in FIGS. 3 and 4, the light valve 12 includes an electro-optic element 17 and a plurality of individually addressable electrodes 18a–18i (collectively identified in FIG. 3 by 18) which are distributed across essentially the full width of the electro-optic element 17. Typically, the electrodes 18a–18i are 1–30 microns wide and are on centers which are more or less equidistantly separated to provide a generally uniform interelectrode gap spacing of 1–30 microns.

For a total internal reflection (TIR) mode of operation as illustrated, the electro-optic element 17 suitably is a y-cut crystal of, say, LiNbO$_3$ having an optically polished input face 21 at one end, an optically polished output face 22 at its opposite end, and an optically polished intermediate reflecting surface 23. The electrodes 18a–18i are, in turn, engaged with, or at least closely adjacent to, the reflecting surface 23 of the electro-optic element 17, whereby electric fringe fields are coupled into the electro-optic element 17 as subsequently described.

Referring to FIGS. 1–4 for a brief review of the basic operation of the light valve 12, it will be understood that a sheet-like collimated beam of light 24 from a suitable source, such as a laser (not shown), enters through the input face 21 of the electro-optic element 17 at a grazing angle of incidence relative to the reflecting surface 23. The light beam 24 illuminates substantially the full width of the electro-optic element 17 and is brought to a wedge shaped focus (by means not shown) at approximately the longitudinal centerline of the reflecting surface 23 where it is totally internally reflected to exit from the electro-optic element 17 through the output face 22. While passing through the electro-optic element 17, the light beam 24 is spatially phase front modulated in accordance with differentially encoded data samples applied to the electrodes 18a–18i.

Differential encoding is described in substantial detail in a copending commonly assigned U.S. patent application of W. D. Turner et al, which was filed Sept. 17, 1980 under Ser. No. 187,916 on "Differential Encoding for Fringe Field Responsive Electro-Optic Line Printers" and which is hereby incorporated by reference. Thus, it will suffice to note that each differentially encoded data sample, other than the first sample for each line of an image, has a magnitude whose difference from the previous differentially encoded data sample corresponds to the magnitude of a respective input data sample which, in turn, represents a respective picture element of the desired image. The first sample for each line of the image is referenced to a common reference potential, such as ground. These differentially encoded data samples are applied (by means not shown) to the electrodes 18a–18i on a line-by-line basis, whereby all picture elements for any given line of the image are faithfully represented by the electrode-to-electrode voltage drops which are created by the differentially encoded data samples for the particular line. Alternatively, of course, the electrodes 18a–18i could be interleaved with ground plane electrodes (not shown), thereby avoiding the need for such differential encoding.

At any rate, the voltage drops between the electrodes 18a–18i create localized electric fringe fields which penetrate into an interaction region 29 of the electro-optic element 17, thereby producing localized variations in the refractive index of the electro-optic element 17 widthwise of the interaction region 29. Consequently, while the light beam 24 is traversing the interaction region 29, its phase front is sequentially spatially modulated in accordance with the data samples for successive lines of the desired image.

As will be appreciated, the phase front modulation of the light beam 24 produces a corresponding diffraction pattern. Light from those phase front regions of the light beam 24 which experience no phase alteration is concentrated in the zero order diffraction component, while light from the other or phase change regions is scattered into a broad spectrum of higher order diffraction components. The magnitude of this diffraction phenomenon is independent of the sign of the phase change, which means that the line printer 11 is insensitive to the polarities of the fringe fields which are coupled into the electro-optic element 17. As shown, the electrodes 18a–18i extend generally parallel to, and have projections of substantial length along, the optical axis of the electro-optic element 17, so that the light valve 12 operates in a "normal incidence mode." Alternatively, of course, the electrodes 18a–18i could be tilted at the so-called Bragg angle relative to the optical axis of the electro-optic element 17, thereby causing the light valve 12 to operate in a "Bragg mode."

Returning to FIGS. 1 and 2, to expose the recording medium 13 in an image configuration, there suitably are Schlieren central dark field imaging optics 31. The imaging optics 31 are optically aligned between the light valve 12 and the recording medium 13 for converting the spatial phase front modulation of the light beam 24 into a correspondingly modulated intensity profile and for providing any magnification that is required to obtain an image of a desired width. To perform the conversion, the imaging optics 31 typically include a field lens 34 for focusing the zero order diffraction components 32 of the phase front modulated light beam 24 onto a central beam stop 55 (FIGS. 2 and 5) and an imaging lens 36 for collecting the higher order diffraction components so that they fall onto the recording medium 13, i.e. the image plane for the light valve 12.

Beam stop 55 comprises an aperture plate member 50 formed from a suitable light impervious or opaque material such as metal having a pair of adjoining generally rectangular apertures or openings 52, 53 herein. The web-like central portion of plate 50 separating apertures 52, 53, serves to form a rectangular stop 55 for blocking zero order diffraction components 32, the opposing sides thereof defining the interior vertical edges 58, 59 of apertures 52, 53.

Beam stop 55 is more or less centrally located within the aperture of the imaging optics 31. Indeed, it effectively resides in the Fourier transform plane (in other words, the rear focal plane) of the imaging optics 31. As shown, the field lens 34 is optically aligned between the light valve 12 and the stop 55 so that substantially all of the zero order components 32 of the light beam 24 are blocked by the beam stop 55. However, the higher order diffraction components scatter around the stop 55 and pass through apertures 52, 53 and are collected by the imaging lens 36 so that they are focused onto the recording medium 13. Alternatively, of course, the conversion process could be carried out by Schlieren central bright field imaging optics. In that event, the zero order diffraction components would be focused onto the recording medium 13 and the higher order diffraction components would be blocked by the stop 55.

Briefly summarizing, it will be understood that each neighboring pair of electrodes, such as 18a–18b (FIG. 4) cooperates with the electro-optic element 17 and with the Schlieren imaging or readout optics 31 to effectively define a local modulator for creating a picture element at a unique, spatially predetermined position along each line of the image, as indicated in FIG. 2 by the broken lines 41. Accordingly, the number of electrodes 18a–18i determines the number of picture elements that can be printed per line of the image.

There normally are sharp discontinuities in the transmittance profile widthwise of the imaging aperture of a Schlieren imaging system (i.e. along the modulation axis of the line printer 11) from the use of a stop having a rectangular spatial profile. Intuitively, such a stop is suitably configured for selectively blocking the zero order diffraction components of the phase front modulated light beam 24 (FIGS. 1 and 2) while passing its higher order diffraction components, but experience and careful analysis have demonstrated that a rectangular stop produces relatively high levels of unwanted interpixel crosstalk. The nature and extent of such crosstalk is illustrated in FIG. 7a which is an idealized intensity profile for a segment of a line having all picture elements or pixels "turned on" except for two centrally located picture elements which are "turned off" or blocked out. As will be seen, the intensities of the picture elements (identified by the numeral 60) that are "turned on" are modulated by crosstalk with the blocked picture elements with the result that the picture elements 60 have different and uneven intensities. Additionally, the picture elements immediately adjacent the blocked off picture elements (identified by the numeral 60') have substantially reduced intensities. Surprisingly, it was found that such crosstalk was produced entirely by diffraction off the rectangular stop 55.

Referring now to FIGS. 6a–6d, there is shown various light amplitude transmittance profiles. In FIG. 6a, a rectangular stop profile, in FIG. 6b, a triangular profile, in FIG. 6c, a cosine profile, and in FIG. 6d, a Gaussian profile. Each stop transmittance profile (designated TA) has the same half width W (i.e. W=2a) and the same aperture width A (i.e. A=2b) at the stop plane. The effect of these stop profiles on an aerial image (at photoreceptor 13) in which two adjoining pixels in an image line are blocked out is shown in corresponding FIGS. 7a–7d, the pixel intensity curve C being obtained by the central dark ground method. As may be seen from FIGS. 7a–7d, the rectangular stop profile (FIG. 7a) yields the poorest image quality with the intensity of the pixels 60 varying widely and the intensity of the pixels 60' next to the pixel pair that are blocked off being reduced substantially.

The Gaussian stop profile (FIG. 7d) shows dramatic improvement both in the uniformity of pixel intensity as well as in a substantial increase in the intensity of the pixels 60' next to the pixel pair that are blocked off. Similarly, the triangular and cosine stop profiles (FIGS. 7b and 7c, respectively), show similar substantial improvement over the rectangular stop profile. Overall, the triangular stop profile demonstrates slightly superior performance than either the cosine or Gaussian stop profiles.

Figure 8A:
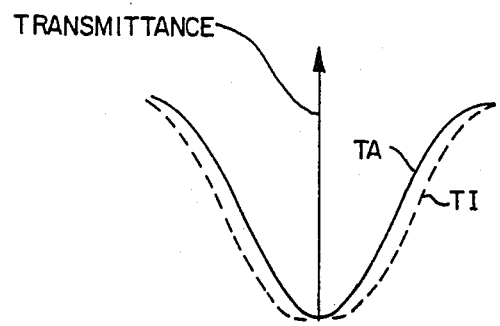
FIGS. 8a, 8b are views showing a beam stop capable of providing the improved Gaussian light amplitude transmittance profile shown in FIG. 6d, with the Gaussian light amplitude transmittance profile being superimposed thereon for clarity.
Figure 8B:
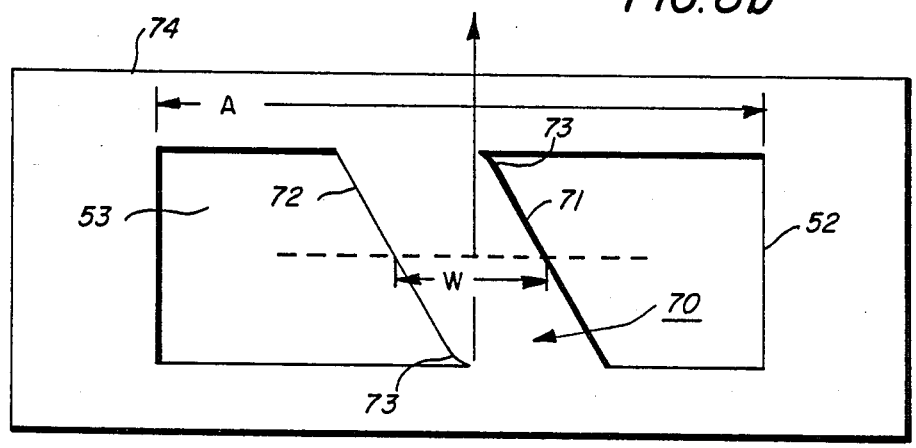

Referring particularly to FIGS. 8a and 8b of the drawings, the Gaussian stop profile TA is plotted and the corresponding intensity transmittance function (designated TI) is obtained by taking the square of the stop profile TA. Assuming that a truncated Gaussian light intensity distribution incident upon the stop plane in the cross scan direction (y) is desired, the geometry of the beam stop is determined by normalizing the x coordinate to the half width of TA and the y coordinate to half the radius of light distribution in the y direction which is assumed to be the same as the half width of TA. The resulting zero order beam stop 70 comprises a plate 74 having aperture openings 52, 53 therein, the interior sides 71, 72 of which are tapered with slight curvature at 73 as the stop centerline is approached.

In principle, the width of stop 70 (W=2a), should be as small as possible (as long as it is wide enough to block the zero order diffraction components) to achieve high system radiometric efficiency and good image quality. To further reduce interpixel crosstalk, the aperture width (A=2b), may be narrowed to filter out the high frequency components passing through the stop and thus eliminate some of the high order interferences between the diffracted components. The aperture width A can be reduced to such an extent that only the first and second order beams are allowed to pass through the plate 74.

Figure 9:
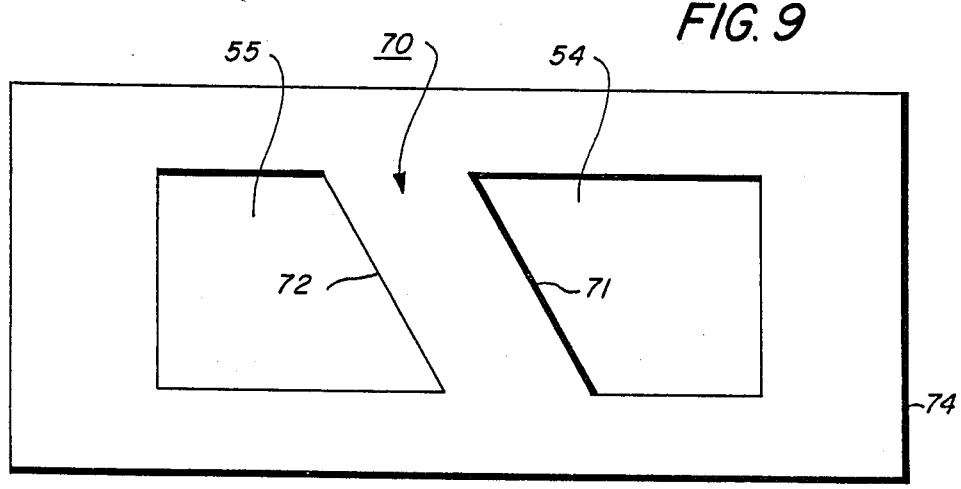
FIG. 9 is a view of the beam stop shown in FIG. 8 with the sides smoothed out to enhance manufacturability.

Referring to FIG. 9, and using the above-described aperture reduction and the Gaussian stop function, the stop 70 is approximated by a parallelogram wherein the sides 71, 72 are parallel to one another. The relative simplicity and ease of manufacture of plate 74 with stop 70 as well as the improved system performance makes this stop configuration highly desirable.

Referring to the embodiments shown in FIGS. 10a and 10b, and FIGS. 11a and 11b, the foregoing analysis is employed to design stops 80, 85 which will produce the triangular and cosine light profiles shown in FIGS. 6b and 6c respectively. The stops 80, 85 bear configurations that are generally similar to the stop 70, with variations in stop width W and in the shape and angle of the stop sides 81, 82 and 86, 87 respectively.

While the invention has been described with reference to the structure disclosed, it is not confined to the details set forth but is intended to cover such modifications or changes as may come within the scope of the following claims.

We claim:

1. In an electro-optic printer having a multigate light valve for serially phase front modulating a sheet-like collimated light beam in accordance with picture elements for successive lines of an image so that the modulated light beam includes zero order and higher order diffraction beams, a photosensitive recording medium, and Schlieren imaging optics optically aligned between said light valve and said recording medium for sequentially exposing said recording medium to successive lines of said image; said imaging optics having an aperture including a stop configured to substantially attenuate a selected one of either the zero order or the high order diffraction beams of said modulated light beam while causing relatively little attenuation of the other of said zero order or said diffraction beams, the improvement wherein said stop comprises:

an opaque member having a pair of spaced axially aligned slit-like apertures through which said other of said zero order or said diffraction beams pass to expose said recording medium, the portion of said opaque member laying between said aperture pair forming a beam stop for substantially attenuating said one of said zero order or said diffraction beams, the sides of said beam stop defining the interior adjoining walls of each one of said aperture pair, said beam stop sides being smoothly tapered in complementing relation with one another.

2. The printer according to claim 1 in which said beam stop sides are parallel to one another whereby said beam stop is substantially in the shape of a parallelogram.

3. The printer according to claim 1 in which said beam stop is configured to produce a triangular light transmittance profile.

4. The printer according to claim 1 in which said beam stop is configured to produce a cosine light transmittance profile.

5. The printer according to claim 1 in which said beam stop is configured to produce a Gaussian light transmittance profile.

* * * * *